(12) United States Patent
Cayton

(10) Patent No.: US 8,899,973 B2
(45) Date of Patent: * Dec. 2, 2014

(54) CANDLE WITH EMBEDDED ITEM AND METHODS FOR MANUFACTURING AND SELLING SAME

(71) Applicant: Diamond Candles, LLC, Durham, NC (US)

(72) Inventor: David Anthony Cayton, Bahama, NC (US)

(73) Assignee: Diamond Candles, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,217

(22) Filed: Feb. 19, 2014

(65) Prior Publication Data

US 2014/0170579 A1 Jun. 19, 2014

Related U.S. Application Data

(63) Continuation of application No. 13/554,519, filed on Jul. 20, 2012, now Pat. No. 8,758,008.

(60) Provisional application No. 61/598,662, filed on Feb. 14, 2012.

(51) Int. Cl.
| | |
|---|---|
| *B29C 70/70* | (2006.01) |
| *B29C 39/10* | (2006.01) |
| *C11C 5/00* | (2006.01) |
| *F23D 3/16* | (2006.01) |
| *C11C 5/02* | (2006.01) |

(52) U.S. Cl.
CPC ............... *B29C 70/70* (2013.01); *B29C 39/10* (2013.01); *C11C 5/00* (2013.01); *F23D 3/16* (2013.01); *C11C 5/02* (2013.01); *C11C 5/008* (2013.01)
USPC ............ 431/289; 431/291; 431/292; 446/369

(58) Field of Classification Search
USPC ................... 431/289, 291, 292, 290; 446/369
See application file for complete search history.

(56) References Cited

U.S. PATENT DOCUMENTS

| | | | | | |
|---|---|---|---|---|---|
| 2,735,285 | A | * | 2/1956 | Ferleger | 431/288 |
| 4,696,640 | A | * | 9/1987 | Pitchford | 431/289 |
| 6,241,512 | B1 | * | 6/2001 | Freeman et al. | 431/291 |
| 6,435,694 | B1 | * | 8/2002 | Bell et al. | 362/161 |
| 6,491,517 | B2 | * | 12/2002 | Freeman et al. | 431/291 |
| 6,669,468 | B2 | * | 12/2003 | Pesu | 431/291 |
| 6,680,014 | B2 | * | 1/2004 | Wu | 264/73 |
| 6,733,280 | B1 | * | 5/2004 | Livne et al. | 431/288 |
| 6,896,511 | B2 | * | 5/2005 | Chadha | 431/289 |
| 2002/0168919 | A1 | * | 11/2002 | Perkins | 446/369 |
| 2005/0227193 | A1 | * | 10/2005 | Lin | 431/291 |
| 2008/0036116 | A1 | * | 2/2008 | Lajoie | 264/299 |

* cited by examiner

*Primary Examiner* — Avinash Savani
(74) *Attorney, Agent, or Firm* — Jenkins, Wilson, Taylor & Hunt, P.A.

(57) ABSTRACT

A candle with an embedded item and methods for manufacturing same are disclosed. According to one aspect, a method for manufacturing a candle having an item embedded within includes providing a first set of items of a first value and a second set of items of a second value different from the first value, combining the two sets to create a third set, and distributing the items of the third set among a set of candles, one item per candle, where the presence, nature, or value of the item within the candle is obscured. In one embodiment, the method further includes selling the candles for a first price, wherein, at the time of purchase, the presence of the embedded item, the nature of the embedded item, the value of the embedded item, or the value of the embedded item relative to the first price is not known to the purchaser.

4 Claims, 2 Drawing Sheets

CANDLE WITH EMBEDDED ITEM AND METHODS FOR MANUFACTURING AND SELLING SAME

PRIORITY CLAIM

This application is a continuation from U.S. patent application Ser. No. 13/554,519, filed on Jul. 20, 2012, which claims the benefit of U.S. Provisional Patent Application Ser. No. 61/598,662, filed Feb. 14, 2012; the disclosures of which are incorporated herein by reference in their entireties.

TECHNICAL FIELD

The subject matter described herein relates to candles with items embedded within and methods for manufacturing and selling same.

BACKGROUND

People like to give and receive presents. In some cultures it is customary to wrap a gift present in an attractive package which is pleasing to the eye of the recipient and which also prevents the recipient from immediately knowing the nature or value of the present, which peaks the interest of the recipient, increases the recipient's anticipation of the unwrapping of the gift, and increases the recipient's delight and enjoyment of the gift revealed.

Candles are popular gifts due to their pleasant form, color, and/or scent. A burning candle provides a warm, relaxing atmosphere, and candles are associated with love, romance, or special occasions. Candle bodies are typically made of an opaque or translucent material, such as wax, which is consumed while the candle burns.

Candle bodies thus make an ideal container within which to hide an item, such as jewelry, gifts traditionally given on romantic or special occasions, or other items, where the presence, nature, or value of the item is slowly revealed as the candle body is consumed, to the delight of the recipient of the candle. In addition, the excitement of anticipation one feels while waiting to find out the nature or value of a gift received may be heightened when the recipient of a candle containing an embedded item knows beforehand that there is a possibility that the value of the embedded item may be larger, and sometimes much larger, than the purchase price of the candle within which the item is embedded.

Thus, there is a need for candles with items embedded within them where the presence, nature, or value of the embedded item is obscured by the candle body and therefore unknown to the purchaser or user of the candle until the candle body has been consumed sufficiently to reveal the presence, nature, or value of the item.

SUMMARY

According to one aspect, the subject matter described herein includes a method for manufacturing a candle having an item embedded within. The method includes: providing a first set of items, each item having a first value; providing a second set of items, each item having a second value different from the first value; combining the first and second sets to create a third set; and distributing the items of the third set among a set of candles, such that each candle includes one item from the third set embedded within the candle, wherein the presence, nature and/or value of the item within the candle is obscured. In one embodiment, the candles so manufactured are sold for a first price, wherein, at the time of purchase, the presence of the embedded item, the nature of the embedded item, the value of the embedded item, and/or the value of the embedded item relative to the first price is not known to the purchaser.

According to another aspect, the subject matter described herein includes a candle with an embedded item. The candle includes a candle body including wax and a wick, where the candle body includes an embedded item such that the presence, nature, and/or value of the item is obscured by the candle body.

As used herein, the term "wax" refers to substances that may be used to form a candle body and which are consumed, usually as fuel, while the candle burns. Examples include, but are not limited to, animal fats or waxes, such as tallow, insect waxes, such as bee's wax, plant waxes and fats, such as soy-based products, and petroleum-based substances, such as paraffin.

As used herein, the term "wick" refers to any object which holds the flame of a candle. Examples include, but are not limited to, string, cord, wood, or other objects that draw the liquid fuel to the flame, usually via capillary action.

According to yet another aspect, the subject matter described herein includes a method for manufacturing a candle that contains an item whose presence, nature, and/or value is obscured from the buyer. The method includes attaching an item to the inside of a container, and filling the container with wax such that the wax obscures the nature or value of the item.

According to yet another aspect, the subject matter described herein includes another method for manufacturing a candle that contains an item whose presence, nature, or value is obscured from the buyer. The method includes adding a first amount of wax to a container or mold, allowing the first amount wax to harden sufficiently enough to support an item that is placed on the surface of the wax, placing the item on the surface of the wax; and adding into the container a second amount of wax at least sufficient to obscure the presence, nature, or value of the item.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The inventions described herein include a candle having an embedded item within and methods for manufacturing and selling same. Example embedded items include, but are not limited to, jewelry, such as rings, earrings, and chains, precious or semiprecious stones, pearls, etc. As an example, a method for manufacturing a candle having a ring embedded within is disclosed.

Figure 1:
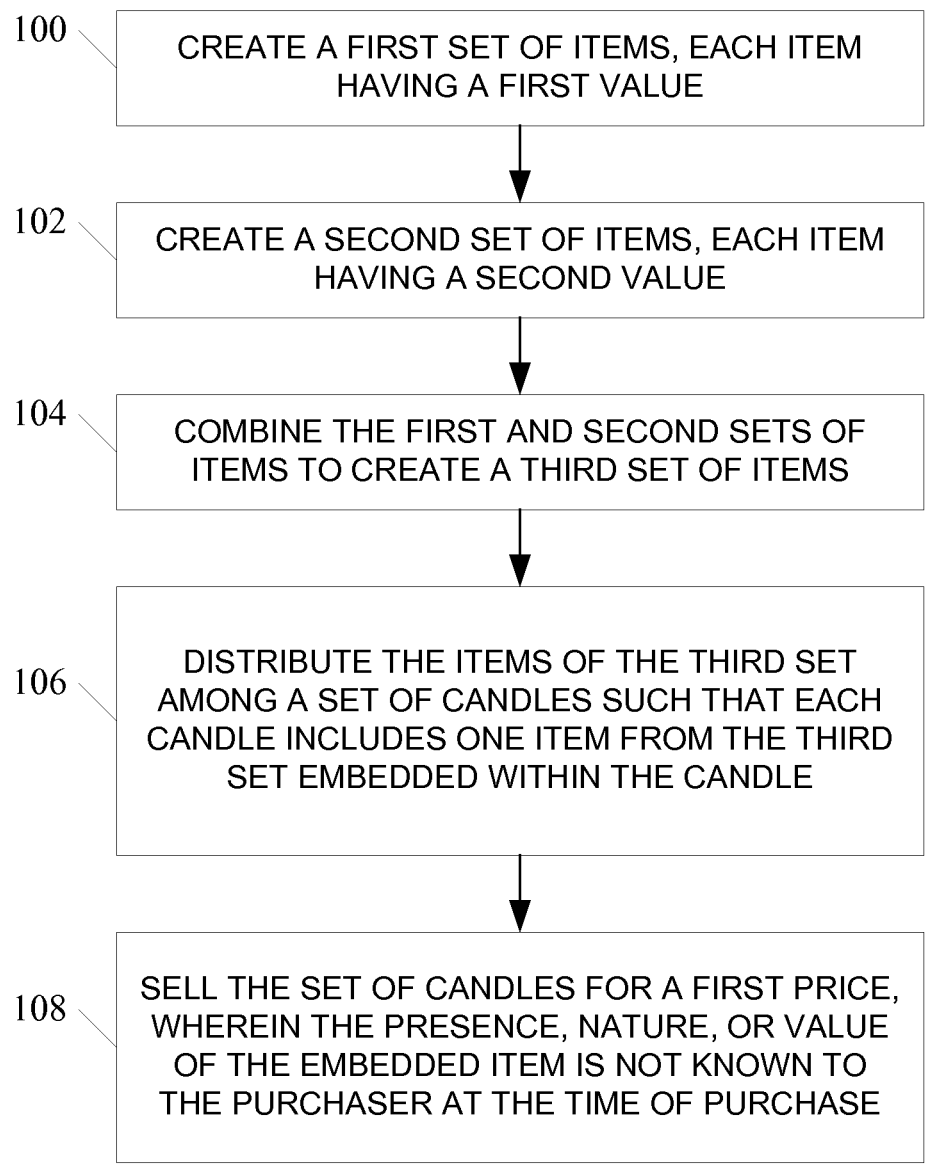
FIG. 1 shows a method for making a candle that contains an item according to one embodiment of the subject matter described herein.

FIG. 1 shows a method for making a candle that contains an item according to one embodiment of the subject matter described herein. At step 100, a first set of items, each having a first value, is created. For example, a set of rings, each ring worth $10, may be collected and optionally prepared for embedding within the finished product candles. At step 102, a second set of items, each having a second value, is created. For example, a set of rings, each ring worth $100, may be collected and optionally prepared for use. Other sets of rings may be collected, each additional set having rings each worth another value, such as $1,000 per ring, $5,000 per ring, and so on. The values used above are for illustration only and are not limiting. All items in a set need not be the same. For example, a set of items may include different types of items, such as rings, earrings, pins, etc., but having the same or very similar relative value. Moreover, items in one set need not be the same as items in another set. For example, the first set of items could be rings and earrings while the second set of items could be bracelets and necklaces.

At step 104, the sets of rings are combined. At step 106, the combined set of items is distributed among a set of candles such that each candle includes one item from the combined set embedded within the candle. At step 108 the candles are sold for a first price, where the value of the embedded item is not known to the purchaser at the time of purchase. In one embodiment, the value of the item cannot be determined by the purchaser of the candle until the candle has been burned or the wax melted to expose the item (or allow the item to be removed and unwrapped if the item has been encased in a pouch, bag, or protective wrapping.) In one embodiment, the purchaser knows that a candle might contain an embedded item but cannot determine at the time of purchase whether the candle does or does not contain the embedded item.

Figures 2A, 2B, 2C, 2D:
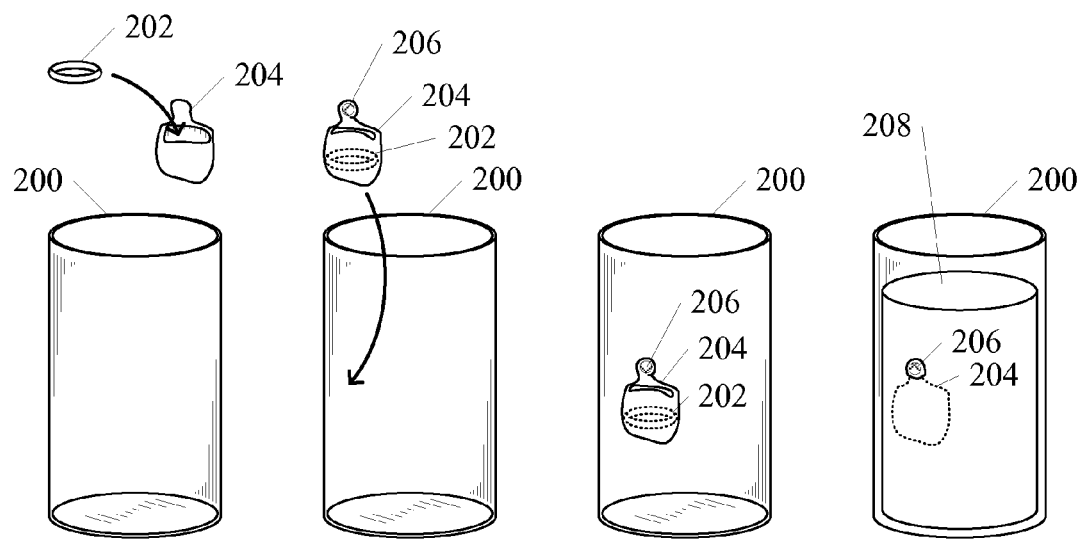
FIGS. 2A through 2D show the steps of a method for manufacturing a candle having an item embedded within according to an embodiment of the subject matter described herein.

FIGS. 2A through 2D show the steps of manufacturing a candle having an item embedded within according to one embodiment of the subject matter described herein. In FIG. 2A, a container 200 is provided. In one embodiment, container 200 may be intended to contain the finished product, and may be made of glass, plastic, or other material, and may be transparent, translucent, opaque, or some combination. Alternatively, container 200 may not be intended to contain the finished product, e.g., the container may be a mold that is used (and possibly reused) during manufacture and is not a part of the finished product.

An item 202, such as a ring, jewelry, prize, or other item, is placed into a pouch 204 or other item container. In FIG. 2B, adhesive 206 is applied to the pouch 204 containing the item 202, and the pouch 204 is attached to the inside wall of candle container 200, such that the pouch is affixed to the inside of the candle container, as shown in FIG. 2C. Wax 208 is then poured into candle container 200, covering the pouch 204 and obscuring the item 202 from view, resulting in the product shown in FIG. 2D. In one embodiment, a wick may be placed or affixed within container 200 prior to adding wax 208. Alternatively, a wick may be inserted into wax 208 after it has been poured into container 200.

For example, in one embodiment, rings of different values are placed into small plastic bags, and each small plastic bag is wrapped in gold foil. For each ring wrapped in plastic and gold foil, a small gold foil indicator is glued to the gold foil that contains the ring and bag. The small gold foil indicator is glued to the inside of the glass container, which allows the customer to see the location of the ring within the container. The small gold foil indicator is visible through the glass container. Wax is poured into the glass container and a wick is installed into the wet wax. In one embodiment, the wax is soy wax. The wax cools or is cooled, and labels are applied to the glass container and/or the wax. In one embodiment, the item may be affixed in more than one place to the container prior to filling the container with wax. In one embodiment, the process may include applying labels or decorations to the inside or outside of container 200 prior to adding wax 208. For example, the process may include applying a safety label to the bottom of a glass container that will contain the candle wax.

Figures 3A, 3B, 3C:
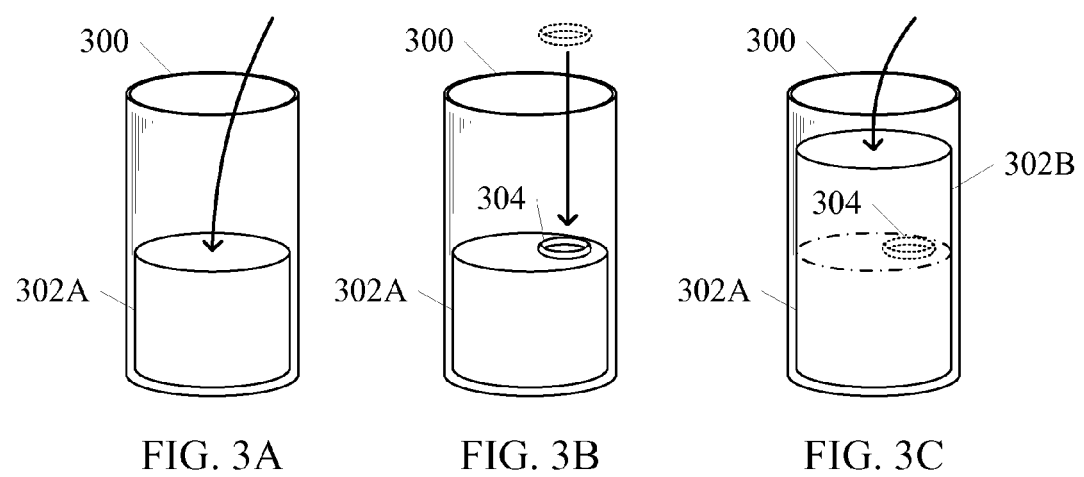
FIGS. 3A through 3C show the steps of an alternative method for manufacturing a candle having an item embedded within according to an embodiment of the subject matter described herein, in which the candle may be partially constructed and the item introduced or placed into the candle before construction of the candle is completed.

FIGS. 3A through 3C show the steps of an alternative method for manufacturing a candle having an item embedded within, in which the candle may be partially constructed and the item introduced or placed into the candle before construction of the candle is completed. In FIG. 3A, for example, a candle mold or container 300 may be partially filled with wax 302A, which is allowed to harden until it is firm enough to support the item 304 in the desired location within the candle body. In FIG. 3B, item 304 is placed onto or into the firm wax 302A at or near the desired location within the candle body, and in FIG. 3C, additional wax 302B is placed into mold 300. The amount of additional wax 302B is sufficient to at least cover and obscure item 304 and may partially or completely fill container 300. In one embodiment, a wick is then inserted into wax 302A and 302B. In an alternative embodiment, the wick is placed within container 300 prior to adding wax 302A and/or wax 302B.

The subject matter described herein also includes a candle with an item embedded within, such as are shown in FIGS. 2D and 3C. In one embodiment, the item may be a ring, other types of jewelry, other types of prizes, or other item. In one embodiment, the candle is designed such that the existence, nature, or value of the embedded item cannot be determined without burning the candle or otherwise melting the wax so that the item is exposed to view.

In one embodiment, the purchaser is not aware at the time of purchase that the candle contains an embedded item at all. In one embodiment, the purchaser is aware at the time of purchase that the candle does contain an embedded item, but the candle is designed so that at the time of purchase, a purchaser of the candle does not know or cannot determine the general nature of the item, the exact nature of the item, the absolute value of the item, the price range of the item, and/or the value of the item relative to the purchase price of the candle.

The candle may comprise wax within a shell or container, or wax not contained in a shell or container. The wax and/or container may be transparent, translucent, or opaque. For example, all or part of the container may be transparent allowing the wax to be seen, but the opacity of the wax prevents the buyer from determining the nature or value of the item embedded within. Alternatively, the wax may be translucent but the container is also translucent with the result that the nature or value of the item embedded within the wax is indiscernible. Alternatively, the nature or value of the item may be obscured by an opaque material (other than the wax of the candle) that surrounds or covers the item and where the item and the opaque covering are both embedded within the candle wax. In one embodiment, the wax and container may be transparent or translucent enough to see the item but the opaque material in which the item is wrapped obscures the nature or value of the item. In one embodiment, the item may be covered or wrapped with a material that prevents damage to the item from the heat of the candle flame as the candle wax is burned away to expose the item.

The subject matter described herein also includes a method for making a candle that contains an item such that the nature and/or value of the item is obscured from the buyer. In one embodiment, the value of the embedded item may be less than the sale price of the candle, equal to the sale price of the candle, greater than the sale price of the candle, or much greater than the sale price of the candle. For example, a candle may be sold for $25 that contains within it a ring which may have a value of $10, $100, $1,000, or $5,000.

What is claimed is:

1. A method for manufacturing a candle having an item embedded within, comprising:
    providing a first set of items, each item having a first value;
    providing a second set of items, each item having a second value different from the first value;
    combining the first and second sets to create a third set; and
    distributing the items of the third set among a set of candles, such that each candle includes wax, a wick, and one item from the third set enclosed within a first container that is embedded within the wax of the candle body, wherein the first container is attached to the inside of a second container that forms a periphery of the candle such that the presence of the first container is visible through the second container to a buyer but such that, at the time of purchase of the candle for a first price, at least one of: the nature of the embedded item, the value of the embedded item, and the value of the embedded item relative to the first price is not known to the purchaser.

2. The method of claim 1 comprising selling the candles for the first price.

3. The method of claim 1 wherein the second container comprises a material to protect the item from heat or fire damage.

4. The method of claim 1 wherein the second container comprises plastic or metal foil.

* * * * *